United States Patent
Wang

(10) Patent No.: US 10,225,998 B2
(45) Date of Patent: Mar. 12, 2019

(54) CULTIVATION MANAGEMENT APPARATUS FOR EDIBLE PERENNIAL HERBACEOUS FLOWERING PLANTS AND BULBS AND TUBERS

(71) Applicant: Youngsung Wang, Gyeonggi-do (KR)

(72) Inventor: Youngsung Wang, Gyeonggi-do (KR)

( * ) Notice: Subject to any disclaimer, the term of this patent is extended or adjusted under 35 U.S.C. 154(b) by 388 days.

(21) Appl. No.: 14/911,731

(22) PCT Filed: Aug. 15, 2014

(86) PCT No.: PCT/KR2014/007605
§ 371 (c)(1),
(2) Date: Feb. 21, 2016

(87) PCT Pub. No.: WO2015/023158
PCT Pub. Date: Feb. 19, 2015

(65) Prior Publication Data
US 2016/0262321 A1    Sep. 15, 2016

(30) Foreign Application Priority Data

Aug. 15, 2013 (KR) .................. 10-2013-0096965
Sep. 16, 2013 (KR) .................. 20-2013-0007744
Nov. 11, 2013 (KR) .................. 10-2013-0136048

(51) Int. Cl.
*A01G 27/00* (2006.01)
*A01G 27/06* (2006.01)
(Continued)

(52) U.S. Cl.
CPC .............. *A01G 27/06* (2013.01); *A01G 9/02* (2013.01); *C05B 17/00* (2013.01)

(58) Field of Classification Search
CPC ........ A01G 9/02; A01G 27/00; A01G 27/001; A01G 27/02; A01G 27/06
(Continued)

(56) References Cited

U.S. PATENT DOCUMENTS 4,096,663 A * 6/1978 Silver .................... A01G 27/06
                                                                 47/80
4,216,623 A * 8/1980 Silver .................... A01G 27/02
                                                                 47/80
(Continued)

FOREIGN PATENT DOCUMENTS

JP        06-005437 U     1/1994
KR   10-2001-0099373 A   11/2001
(Continued)

OTHER PUBLICATIONS

International Search Report for PCT/KR2014/007605 dated Dec. 18, 2014 from Korean Intellectual Property Office.

*Primary Examiner* — David J Parsley
*Assistant Examiner* — Danielle A Clerkley
(74) *Attorney, Agent, or Firm* — Revolution IP, PLLC

(57) ABSTRACT

Disclosed is a cultivation management apparatus for edible perennial herbaceous flowering plants and bulbs and tubers. The cultivation management apparatus allows plants to root and take root and to grow stably in a constant immersed state in order of 40%~50% of water with low temperature treatment for dormancy by filling a movable water tank flowerpot with a moisture absorption member by in the order of 50% of the pot and by filling thereon a plant growth soil member consisting of a mixing oil up to the upper portion and arranging a partition for partitioning off the moisture absorption element from the plant growth soil member.

10 Claims, 10 Drawing Sheets

(51) Int. Cl.
*A01G 9/02* (2018.01)
*C05B 17/00* (2006.01)

(58) Field of Classification Search
USPC .................. 47/66.1, 66.6, 79, 80, 48.5
See application file for complete search history.

(56) References Cited

U.S. PATENT DOCUMENTS

| | | | | | |
|---|---|---|---|---|---|
| 4,557,070 | A | * | 12/1985 | Oyama | A01G 27/04 47/80 |
| 4,895,254 | A | * | 1/1990 | Block | A01G 27/02 206/423 |
| 5,842,310 | A | * | 12/1998 | Liu | A01H 4/001 47/59 R |
| 6,672,007 | B1 | * | 1/2004 | Lai | A01G 27/02 47/79 |
| 8,001,721 | B2 | * | 8/2011 | Okamoto | A01G 31/02 47/21.1 |
| 9,839,183 | B2 | * | 12/2017 | Chang | A01G 27/005 |
| 2005/0252080 | A1 | * | 11/2005 | Wright | A01G 27/04 47/79 |
| 2006/0150505 | A1 | | 7/2006 | Wang | |
| 2009/0013598 | A1 | * | 1/2009 | Mileto | A01G 9/02 47/48.5 |
| 2009/0313892 | A1 | * | 12/2009 | Hashimoto | A01G 27/02 47/79 |

FOREIGN PATENT DOCUMENTS

| | | |
|---|---|---|
| KR | 10-0499203 B1 | 7/2005 |
| KR | 10-0512692 B1 | 9/2005 |
| KR | 10-1282231 B1 | 7/2013 |

* cited by examiner

CULTIVATION MANAGEMENT APPARATUS FOR EDIBLE PERENNIAL HERBACEOUS FLOWERING PLANTS AND BULBS AND TUBERS

CROSS-REFERENCE TO RELATED APPLICATIONS

This application is a National Stage Application of PCT International Patent Application No. PCT/KR2014/007605 filed Aug. 15, 2014, under 35 U.S.C. § 371, which claims priority to Korean Patent Application Nos. 10-2013-0096965 filed Aug. 15, 2013, 20-2013-0007744 filed Sep. 16, 2013, and 10-2013-0136048 filed Nov. 11, 2013, which are all hereby incorporated by reference in their entirety.

BACKGROUND OF THE DISCLOSURE

Field of the Disclosure

Embodiments of the present disclosure relate to a cultivation management apparatus for edible perennial herbaceous flowering plants and bulbs and tubers, more particularly, to a cultivation management apparatus for edible perennial herbaceous flowing plants, which allows the plants to root and take root and to grow stably in a constant immersed state in order of 40%~50% of water with low temperature treatment for dormancy by filling a movable water tank flowerpot with a moisture absorption member by in the order of 50% of the pot and by filling thereon a plant growth soil member consisting of a mixing oil (culture soil optionally comprising solid fertilizers or organic fermented mixing soil) up to the upper portion and arranging a partition for partitioning off the moisture absorption element from the plant growth soil member.

Background of the Disclosure

Generally, perennial herbaceous flowing plants have roots and stems lasting several years and sprout and bloom every spring. Cultivation of the perennial herbaceous flowing plants is performed by cuttings. Typical examples of such the perennial herbaceous flowing plants include water dropwort, edible asparagus and the like.

Bulbs and tubers are the plants having roots shaped like a ball that grows into a flower or plant. The bulbs and tubers include spring planting bulbs and fall planting bulb. The spring planting bulbs are planted in spring and flower from summer to fall. The fall planting bulbs are planted in fall and in low temperature treatment for dormancy in winter, and flower in spring after breaking the dormancy. Edible bulbs and tubers include bracken, beet, wild chive, mugwort, bamboo shoot, water dropwort, chili pepper and cucumber and similar edible green and root vegetables.

Such the edible perennial herbaceous flowing plants and the bulbs and tubers are planted and rooted in the bare ground by cuttings from farms. After growing for a predetermined time period, they are sown and have a merchantable quality as edible vegetables.

Especially, when planted on a farm in fall by the cuttings, using nodal cutting and rooting, water dropwort (or wild parsley) is rooted and grows in the bare ground over a period of time. While rooting is performed in an immersed state of the bare ground in order to form wetlands, propagation by cutting is performed.

After that, the water dropwort (or wild parsley) is under the low temperature treatment in winter and stores nutrients in a bulb during the period for dormancy. In spring again, normal growth starts and flows. When growing completely, the water dropwort is harvested and used for food.

In such the cultivation, the bare ground is immersed like a puddle for the cutting process. After rooting (or root-taking), the water in the puddle has to be drained by using a water pump and the cultivation requires a particular place, in other words, the bare ground in which the puddle can be formed. However, the naturally formed bare ground is hard to find and the puddle has to be artificially formed in the bare ground disadvantageously.

Moreover, the water pump has to be always arranged to drain the water in case of rain and a house has to be formed for temperature management. Also, growth is performed in a natural state and forcing culture is difficult in such the cultivation.

The growth lasts in the order of the fall, winter (the low temperature treatment) and spring. Accordingly, the number of harvests in a year is limited and it is impossible to harvest in fall and summer.

Meanwhile, in case of cultivating the plants in a movable bottom watering flowerpot to solve the disadvantages mentioned above, culture soil or organic soil has little moisture in the cutting process so that normal rooting and root-taking may not be performed disadvantageously and that root may be taken on the moisture absorption material. Accordingly, there are many problems with recycling of the moisture absorption member in a compensatory planting.

SUMMARY OF THE DISCLOSURE

Accordingly, an object of the present invention is to address the above-noted and other problems.

An object of the present disclosure is to provide a cultivation management apparatus for edible perennial herbaceous flowering plants and bulbs and tubers, which allows the plants to root and take root and to grow stably in a constant immersed state in order of 40%~50% of water with low temperature treatment for dormancy by filling a movable water-tank flowerpot with a moisture absorption element by in the order of 50% of the pot and by filling thereon a plant growth soil member consisting of a mixing oil (culture soil optionally comprising solid fertilizers or organic fermented mixing soil) up to the upper portion and arranging a partition for partitioning off the moisture absorption element from the plant growth soil member and a fertilizer pack, so that anyone can cultivate edible perennial herbaceous flowing plants and bulbs and tubers, i.e., water dropwort (wild parsley), edible asparagus and the like in anyplace and anytime with no influence of external environmental factors, e.g., weather factors.

Another object of the present disclosure is to provide a cultivation management apparatus for edible perennial herbaceous flowering plants and bulbs and tubers, which has the plants planted in a water tank flowerpot to secure mobility and facilitates low temperature treatment so that the plants can be harvested and cultivated even in off-seasons of fall and summer.

A further object of the present disclosure is to provide a cultivation management apparatus for edible perennial herbaceous flowering plants and bulbs and tubers, which constantly has water in a water tank flowerpot by 40%~50% so that the partition and the fertilizer pack as moisturizing elements can maximize the survival probability of microorganisms in the edible plants (the perennial herbaceous flowing plants and the bulbs and tubers) and provide the proper nutrient fertilizers required by the edible plants to maximize the growth speed and to produce safe organic edible vegetables.

A still further object of the present disclosure is to provide a cultivation management apparatus for edible perennial herbaceous flowering plants and bulbs and tubers, which provides a moisture loss preventing member on plant growth soil member to prevent the moisture of the plant growth soil member from being evaporated and dry, so that the growth environment for rooting and taking root from edible plants (the perennial herbaceous flowing plants and the bulbs and tubers) stably and rapidly may be created.

A still further object of the present disclosure is to provide a cultivation management apparatus for edible perennial herbaceous flowering plants and bulbs and tubers, which may recycle the moisture absorption member by separating the moisture absorption member, using a root separation inducing member, in case of replanting the edible plants (the perennial herbaceous flowing plants and the bulbs and tubers) when root grows into a partition and a fertilizer pack to take root to a moisture absorption member of the water tank flowerpot.

A still further object of the present disclosure is to provide a cultivation management apparatus for edible perennial herbaceous flowering plants and bulbs and tubers, which allows the plants to root and take root and to grow stably in a constant immersed state in order of 40%~50% of water with low temperature treatment for dormancy by filling a movable water-tank flowerpot with a moisture absorption member by in the order of 50% of the pot and by sequentially filling thereon a fertilizer pack and an organic planting environment providing unit filled with an organic fermented element, so that so that anyone can cultivate edible perennial herbaceous flowing plants and bulbs and tubers, i.e., water dropwort (wild parsley), edible asparagus and the like in anyplace and anytime with no influence of external environmental factors, e.g., weather factors.

A still further object of the present disclosure is to provide a cultivation management apparatus for edible perennial herbaceous flowering plants and bulbs and tubers, which keeps 40%~50% of water in the water tank flowerpot so that an air gap forming material (wheat straw, sawdust and the like) can maximize the dissolved oxygen and the survival probability of microorganisms in the edible plants (the perennial herbaceous flowing plants and the bulbs and tubers) and provide the proper nutrient fertilizers required by the edible plants to maximize the growth speed and to produce safe organic edible vegetables.

Embodiments of the present disclosure may provide a cultivation management apparatus for edible perennial herbaceous flowering plants and bulbs and tubers including a water tank flowerpot comprising a moisture absorption member having pearlite and Orchid stone and filled therein to a preset height from a bottom to keep a constant immersed state so as to provide moisture to the edible perennial herbaceous flowering plants and bulbs and tubers; and an outlet hole and a stopper formed in an outer surface thereof to adjust a water level so as to contain water up to 40%~60%, when the edible perennial herbaceous flowering plants and bulbs and tubers are rooted; a plant growth soil member provided over the moisture absorption member and filled with a soil mixture or a culture soil or organic fermented soil mixture mixed with a solid fertilizer to an upper portion of the water tank flowerpot up to an upper portion of the water tank flowerpot, so as to plant and root a rhizosphere portion of the edible perennial herbaceous flowering plants and bulbs and tubers and to keep stable plant growth; a partition member provided between the moisture absorption member and the plant growth soil member to partition off the moisture absorption member from the plant growth soil member and to transfer moisture of the water tank flowerpot in the immersed state to the planted edible perennial herbaceous flowering plants and bulbs and tubers, and comprising a moisturizing material formed of non-woven fabric, wood pulp, cotton or cotton broad cloth to be impregnated with the moisture of the moisture absorption member; a moisture loss preventing member provided on the plant growth soil member to prevent exposure of the plant growth soil member and formed of a moisturizing material to impregnate a certain amount of moisture so as to prevent loss of the moisture keeping moisty the plant growth soil member; and a cylindrical water supply member which penetrates the plant growth soil member and contacts with the moisture absorption member of the water tank flowerpot to supply water to the water tank flowerpot rapidly.

Embodiments of the present disclosure may also provide a cultivation management apparatus for edible perennial herbaceous flowering plants and bulbs including: a water tank flowerpot comprising a moisture absorption member having pearlite and Orchid stone and filled therein to a preset height from a bottom to keep a constant immersed state so as to provide moisture to the edible perennial herbaceous flowering plants and bulbs and tubers; and an outlet hole and a stopper formed in an outer surface thereof to adjust a water level so as to contain water up to 40%~60%, when the edible perennial herbaceous flowering plants and bulbs and tubers are rooted; a plant growth soil member provided over the moisture absorption member and filled with a soil mixture or a culture soil or organic fermented soil mixture mixed with a solid fertilizer to an upper portion of the water tank flowerpot up to an upper portion of the water tank flowerpot, so as to plant and root a rhizosphere portion of the edible perennial herbaceous flowering plants and bulbs and tubers and to keep stable plant growth; a pair of partition members comprising a moisturizing material formed of non-woven fabric, wood pulp, cotton or cotton broad cloth to be impregnated with the moisture of the moisture absorption member, and provided between the moisture absorption member and the plant growth soil member to partition off the moisture absorption member from the plant growth soil member and to transfer moisture of the water tank flowerpot in the immersed state to the planted edible perennial herbaceous flowering plants and bulbs and tubers; a solid fertilizer provided between the pair of the partition members and gradually dissolving in the impregnated water of the partition members to supply proper nutrient solution to the edible perennial herbaceous flowering plants and bulbs and tubers which are planted in the plant growth soil member; a moisture loss preventing member provided on the plant growth soil member to prevent exposure of the plant growth soil member and formed of a moisturizing material to impregnate a certain amount of moisture so as to prevent loss of the moisture keeping moisty the plant growth soil member; and a cylindrical water supply member which penetrates the plant growth soil member and contacts with the moisture absorption member of the water tank flowerpot to supply water to the water tank flowerpot rapidly.

A root separation inducting member may be provided between the partition member and the moisture absorption member to separate the moisture absorption member from the partition member rapidly, when root of the plants planed in the plant growth soil member is taken toward the moisture absorption member, and the moisture loss preventing member may be removed to expose the plant growth soil member, when the edible perennial herbaceous flowering plants and bulbs are rooted in the plant growth soil member.

Embodiments of the present disclosure may also provide a cultivation management apparatus for edible perennial herbaceous flowering plants and bulbs including: a water tank flowerpot comprising a moisture absorption member having pearlite and Orchid stone and filled therein to a preset height from a bottom to keep a constant immersed state so as to provide moisture to the edible perennial herbaceous flowering plants and bulbs and tubers; and an outlet hole and a stopper formed in an outer surface thereof to adjust a water level so as to contain water up to 40%~60%, when the edible perennial herbaceous flowering plants and bulbs and tubers are rooted; a plant growth soil member provided over the moisture absorption member and filled with a soil mixture or a culture soil or organic fermented soil mixture mixed with a solid fertilizer to an upper portion of the water tank flowerpot up to an upper portion of the water tank flowerpot, so as to plant and root a rhizosphere portion of the edible perennial herbaceous flowering plants and bulbs and tubers and to keep stable plant growth; a fertilizer pack provided between the pair of the partition members and gradually dissolving in the impregnated water of the partition members to supply proper nutrient solution to the edible perennial herbaceous flowering plants and bulbs and tubers which are planted in the plant growth soil member; a moisture loss preventing member provided on the plant growth soil member to prevent exposure of the plant growth soil member and formed of a moisturizing material to impregnate a certain amount of moisture so as to prevent loss of the moisture keeping moisty the plant growth soil member; and a cylindrical water supply member which penetrates the plant growth soil member and contacts with the moisture absorption member of the water tank flowerpot to supply water to the water tank flowerpot rapidly.

A root separation inducting member may be provided between the fertilizer pack and the moisture absorption member to separate the moisture absorption member from the fertilizer rapidly, when root of the plants planed in the plant growth soil member is taken toward the moisture absorption member, and the moisture loss preventing member may be removed to expose the plant growth soil member, when the edible perennial herbaceous flowering plants and bulbs are rooted in the plant growth soil member.

The fertilizer pack may include an organic compost which provides an environment where microorganisms survive and an organic fertilizer mixed with mineral ores (50.8% calcium, 29.4% phosphorus, 6.7% potassium, 5.1% sulfur, 3.7% chlorine, 2.9% sodium, 1.1% magnesium, 0.3% zinc and copper).

A root separation inducting member may be provided between the partition member and the moisture absorption member to separate the moisture absorption member from the partition member rapidly, when root of the plants planed in the plant growth soil member is taken toward the moisture absorption member, and the moisture loss preventing member may be removed to expose the plant growth soil member, when the edible perennial herbaceous flowering plants and bulbs are rooted in the plant growth soil member.

Embodiments of the present disclosure may also provide a cultivation management apparatus for edible perennial herbaceous flowering plants and bulbs and tubers including: a water tank flowerpot comprising a moisture absorption member having pearlite and Orchid stone and filled therein to a preset height from a bottom to keep a constant immersed state so as to provide moisture to the edible perennial herbaceous flowering plants and bulbs and tubers; and an outlet hole and a stopper formed in an outer surface thereof to adjust a water level so as to contain water up to 40%~60%, when the edible perennial herbaceous flowering plants and bulbs and tubers are rooted; a plant growth soil member provided over the moisture absorption member and filled with a soil mixture (a culture soil and a solid fertilizer) to an upper portion of the water tank flowerpot up to an upper portion of the water tank flowerpot, so as to plant and root a rhizosphere portion of the edible perennial herbaceous flowering plants and bulbs and tubers and to keep stable plant growth; and a partition member provided between the moisture absorption member and the plant growth soil member to partition off the moisture absorption member from the plant growth soil member and to transfer moisture of the water tank flowerpot in the immersed state to the planted edible perennial herbaceous flowering plants and bulbs and tubers, and comprising a moisturizing material formed of non-woven fabric, wood pulp, cotton or cotton broad cloth to be impregnated with the moisture of the moisture absorption member.

Embodiments of the present disclosure may also provide a cultivation management apparatus for edible perennial herbaceous flowering plants and bulbs including: a water tank flowerpot comprising a moisture absorption member having pearlite and Orchid stone and filled therein to a preset height from a bottom to keep a constant immersed state so as to provide moisture to the edible perennial herbaceous flowering plants and bulbs and tubers; and an outlet hole and a stopper formed in an outer surface thereof to adjust a water level so as to contain water up to 40%~60%, when the edible perennial herbaceous flowering plants and bulbs and tubers are rooted; a plant growth soil member provided over the moisture absorption member and filled with a soil mixture (a culture soil) to an upper portion of the water tank flowerpot up to an upper portion of the water tank flowerpot, so as to plant and root a rhizosphere portion of the edible perennial herbaceous flowering plants and bulbs and tubers and to keep stable plant growth; a pair of partition members comprising a moisturizing material formed of non-woven fabric, wood pulp, cotton or cotton broad cloth to be impregnated with the moisture of the moisture absorption member, and provided between the moisture absorption member and the plant growth soil member to partition off the moisture absorption member from the plant growth soil member and to transfer moisture of the water tank flowerpot in the immersed state to the planted edible perennial herbaceous flowering plants and bulbs and tubers; and a solid fertilizer provided between the pair of the partition members and gradually dissolving in the impregnated water of the partition members to supply proper nutrient solution to the edible perennial herbaceous flowering plants and bulbs and tubers which are planted in the plant growth soil member.

Embodiments of the present disclosure may also provide a cultivation management apparatus for edible perennial herbaceous flowering plants and bulbs and tubers including: a water tank flowerpot comprising a moisture absorption member having Hugato and Orchid stone and filled therein to a preset height from a bottom to keep a constant immersed state so as to provide moisture to the edible perennial herbaceous flowering plants and bulbs and tubers; and an outlet hole and a stopper formed in an outer surface thereof to adjust a water level so as to contain water up to 40%~60%, when the edible perennial herbaceous flowering plants and bulbs and tubers are rooted; and a plant growth soil member provided over the moisture absorption member and filled with a soil mixture (a culture soil or a solid fertilizer) to an upper portion of the water tank flowerpot up to an upper portion of the water tank flowerpot, so as to plant and root a rhizosphere portion of the edible perennial herbaceous flowering plants and bulbs and tubers and to keep stable plant growth.

Embodiments of the present disclosure may also provide a cultivation management apparatus for edible perennial herbaceous flowering plants and bulbs and tubers including: an organic planting environment providing element formed of cotton or rough cotton cloth and having a predetermined space formed therein by a mesh material having a drainage function with an open top to accommodate an organic fermented member mixed with an air gap forming material and an animal manure of 5%~10%, the air gap forming member comprising one or more of straw and sawdust to have porosity with air to plant one or more of the edible perennial herbaceous flowering plants and bulbs and tubers in the organic fermented member; an organic fertilizer pack provided under the organic planting environment providing element and filled with an organic compost which provides an environment where microorganisms survive and an organic fertilizer mixed with mineral ores (50.8% calcium, 29.4% phosphorus, 6.7% potassium, 5.1% sulfur, 3.7% chlorine, 2.9% sodium, 1.1% magnesium, 0.3% zinc and copper); and a water tank flowerpot comprising a moisture absorption member having Hugato or Orchid stone and sequentially accommodating the organic fertilizer and the organic planting environment providing element on the moisture absorption member, the water tank flowerpot comprising a water level adjusting valve and an overflow hole formed on an outer surface thereof to contain water up to 40%~50% of a water level when the edible perennial herbaceous flowering plants and bulbs and tubers are rooted and to contain water up to 85%~95% of the water level until the edible perennial herbaceous flowering plants and bulbs and tubers are rooted.

Aerobic microbes and anaerobic microbes may coexist in the environment formed by the organic fermented member and the organic compost, when the edible perennial herbaceous flowering plants and bulbs and tubers are rooted in the organic planting environment providing element and the organic fertilizer and the water level in the water tank flowerpot is adjusted by the water level adjusting valve by 40%~50%.

The organic planting environment providing element may be replaced by a planting flowerpot having a fast drainage function, and the organic fermented member may be replaced by a mixture of organic soil and animal manure, with an air gap forming material.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Referring to the accompanying drawings, a cultivation management apparatus for edible perennial herbaceous flowering plants and bulbs and tubers in accordance with one exemplary embodiment of the present disclosure will be described in detail.

Figure 1:
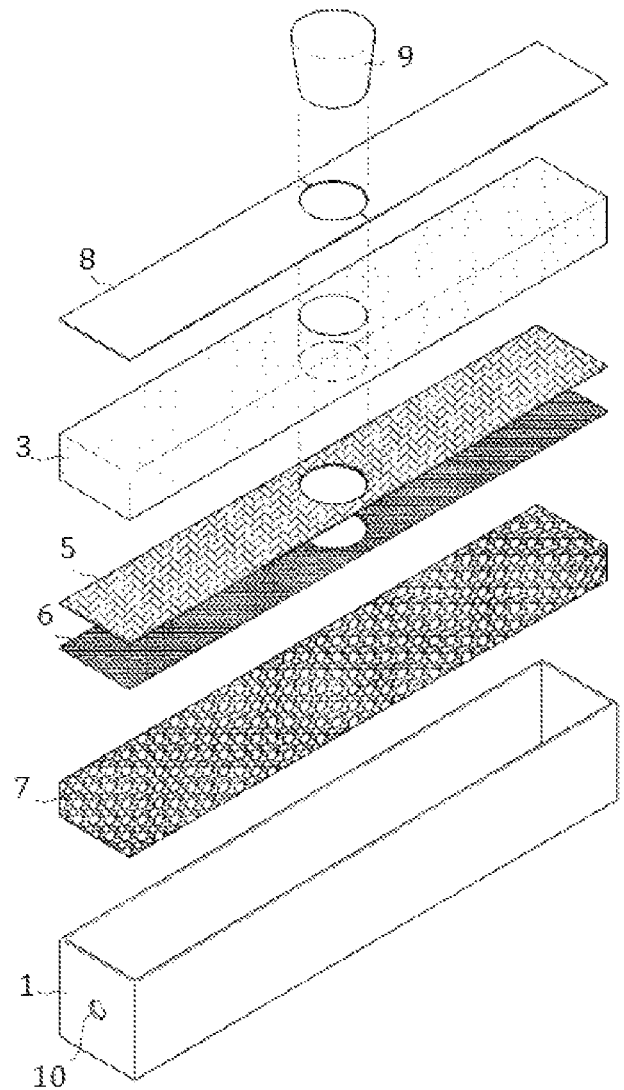
FIG. 1 is an exploded perspective diagram illustrating one example of a cultivation management apparatus for edible perennial herbaceous flowering plants and bulbs and tubers in one exemplary embodiment of accordance with of the present disclosure.
Figure 2:
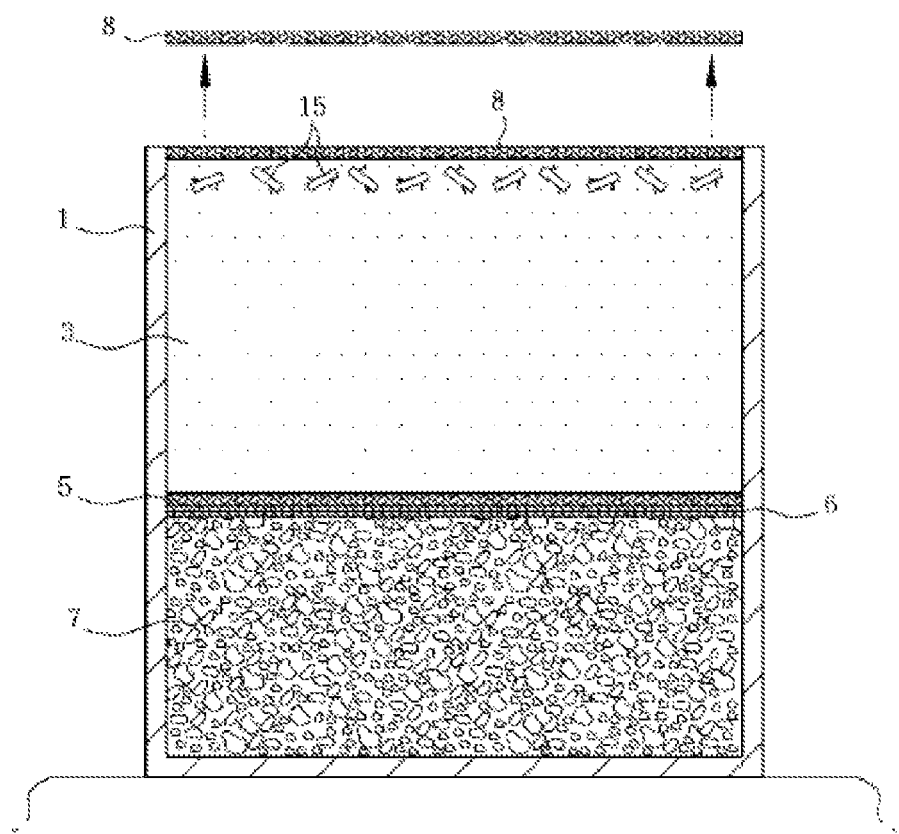
FIG. 2 is a sectional diagram of FIG. 1.

The cultivation management apparatus for edible perennial herbaceous flowering plants and bulbs and tubers shown in FIGS. 1 and 2 includes a water tank flowerpot 1, a plant growth soil member 3, a partition member 5, a root separation inducing member 6, a moisture loss preventing member 8, a water supply member 9 and a water outlet hole 10.

The water tank flowerpot 1 contains water to keep a constant deep flow culture state. The water tank flowerpot 1 is filled with the moisture absorption member 7 up to a preset height to provide the moisture to the edible perennial herbaceous flowering plants and bulbs and tubers and the moisture absorption member 7 consists of Hugato or Orchid stone and pearlite to absorb a predetermined amount of moisture. In this instance, Hugato is a kind of Orchid stone which absorbs moisture and gradually emits the moisture for a preset time period. Hugato is produced in Japan and imported to use.

The water outlet hole 10 is formed in an outer surface of the water tank flowerpot 1 and configured to adjust a water level so as to keep water contained in the water tank flowerpot in order of 40%~60%, when the edible perennial herbaceous flowering plants and bulbs and tubers is rooted. For propagation by cutting, the plant growth soil 3 temporarily impregnates the moisture. A proper water level is 40%~60% to provide a normal plant growth environment once rooting is completed.

The plant growth soil member 3 is provided over the moisture absorption member 7 and a mixture soil (which consists of a culture soil, a solid fertilizer, an organic culture soil, an organic fertilizer, an organic fermented mixture soil) is filled up to an upper portion of the water tank flowerpot 1, so as to plant and root a rhizosphere portion of the edible perennial herbaceous flowering plants and bulbs and tubers and to keep stable plant growth. Cutting slips 15 of the edible plants is planted in the mixture soil according to the propagation by cutting. In a preset time period, the edible plants are rooted and rooted to complete the planting.

The partition member 5 is disposed between the moisture absorption member 7 and the plant growth soil member 3 to partition off them from each other and it transfer the moisture in a state of deep flow culture of the water tank flowerpot to the planted edible perennial herbaceous flowering plants and bulbs and tubers. The partition member 5 is a moisturizing material formed of non-woven fabric, wood pulp, cotton or cotton broad cloth to be impregnated with the moisture of the moisture absorption member 7. The partition member 5 is formed of a synthetic resin material or a natural material and it may absorb the moisture from the moisture absorption member 7 to supply it to the plant growth soil member 3, while partitioning off the moisture absorption member 7 from the plant growth soil member 3.

Moreover, the partition member 5 may separate the plant growth soil member 3 from the moisture absorption member 7 easily and fill a new partition member 5 and plant growth soil member 3 rapidly, so that the edible perennial herbaceous flowering plants and bulbs and tubers may be planted in the manner of the propagation by cutting.

The root separation inducting member 6 is provided under the partition member 5 and it forcibly induces the root to separate the moisture absorption member 7 and the partition member 5 from each other rapidly, when root of the edible perennial herbaceous flowering plants and bulbs and tubers is taken to the moisture absorption member 7 over the partition member 3, in other words, in compensatory planting. The root separation inducting member 6 is formed of a mesh net.

One or more moisture separation inducting members 8 may be detachably provided and arranged in an exposed surface of the plant growth soil member 3 to prevent the moisture from being lost and dry from the plant growth soil member 3 having the cutting slips 15 planted therein for the propagation by cutting. Accordingly, the root of the edible perennial herbaceous flowering plants and bulbs and tubers may be rooted or rooted rapidly. Specifically, the cutting slips 15 withers in the dry plant growth soil member 3 but rapidly roots in the plant growth soil member 3 having proper moisture to facilitate the propagation by cutting.

The water supply member 9 penetrates the plant growth soil member 3 and closely contacts with the moisture absorption member 7 of the water tank flowerpot 1 to supply water, so that the water may be stored in the water tank flowerpot 1 at a preset water level. Alternatively, the water supply member 9 may contact with the root separation inducting member 6 and the partition member 5 and supply water.

In the cultivation management apparatus for edible perennial herbaceous flowering plants and bulbs and tubers according to the present disclosure as shown in FIG. 2, the moisture absorption member 7, the root separation inducting member 6, the partition member 5, the plant growth soil member 3, the moisture loss preventing member 8 are sequentially disposed in the water tank flowerpot 1. The water outlet hole 10 is formed in a lateral surface of the water tank flowerpot 1. In this instance, water is supplied to the water tank flowerpot 1 via the water supply member 9 and the water is contained at a preset water level by the water outlet hole 10, so that the water supply may be performed stably and that the moisture is constantly supplied to the plant growth soil member 3 to be in a moisturized state. To keep the moisturized state, the moisture loss preventing member 8 covers the plant growth soil member 3. At this time, the cutting slips 15 of the edible perennial herbaceous flowering plants and bulbs and tubers are planted for the propagation by cutting.

When the cutting slips 15 are rooted in a preset time period, the moisture loss preventing member 8 is removed to form a dry state up to a certain degree. In this instance, the moisture of the moisture absorption member 7 is supplied to the plant growth soil member 3 along the partition member 5 and transferred to the edible plants so as to facilitate normal growth and development of the plants.

Such the water tank flowerpot has mobility and it can set climatic environment in summer or winter appropriately.

Meanwhile, in case the moisture absorption member 7 and the plant growth soil member 3 are separable from each other, the edible perennial herbaceous flowering plants and bulbs and tubers may grow even without the partition member 5.

Figure 3:
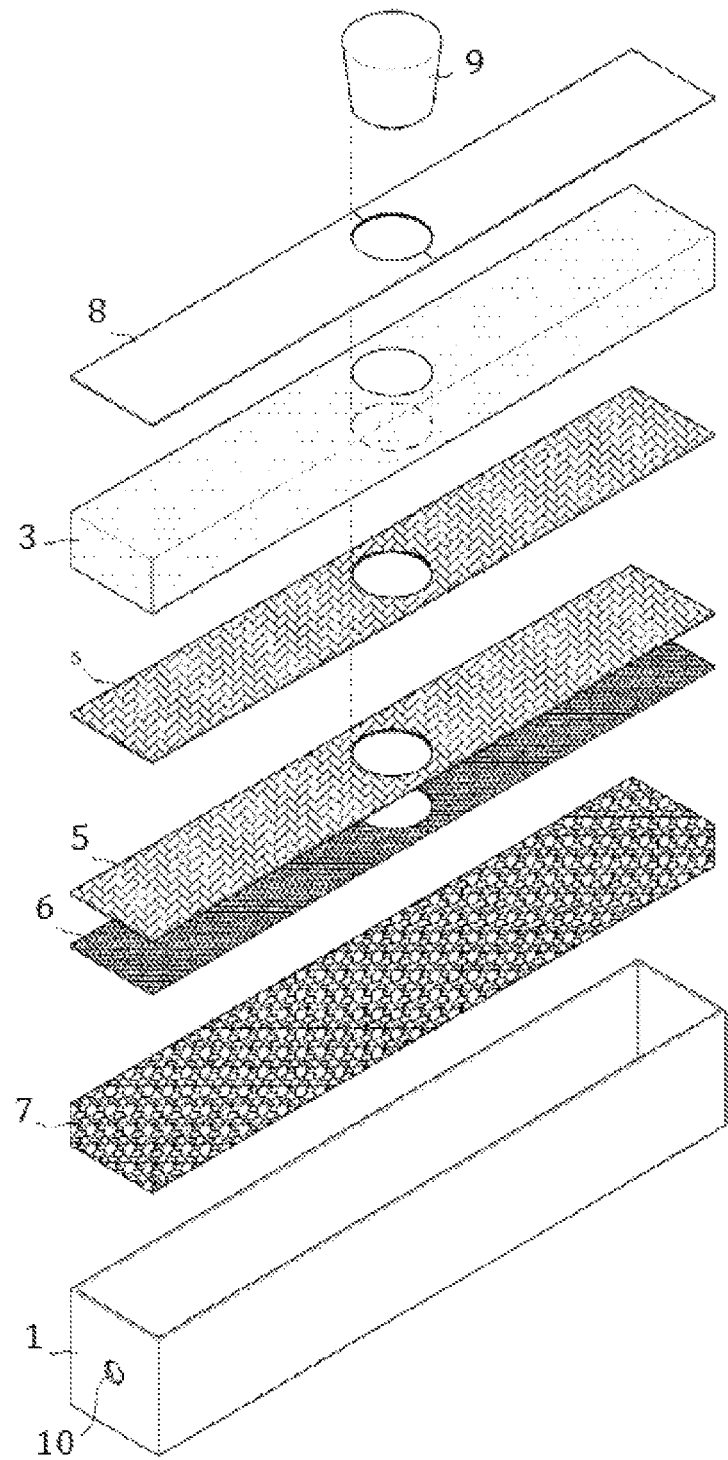
FIG. 3 is an exploded perspective diagram illustrating another example of the cultivation management apparatus for edible perennial herbaceous flowering plants and bulbs and tubers in accordance with the embodiment of the present disclosure.
Figure 4:
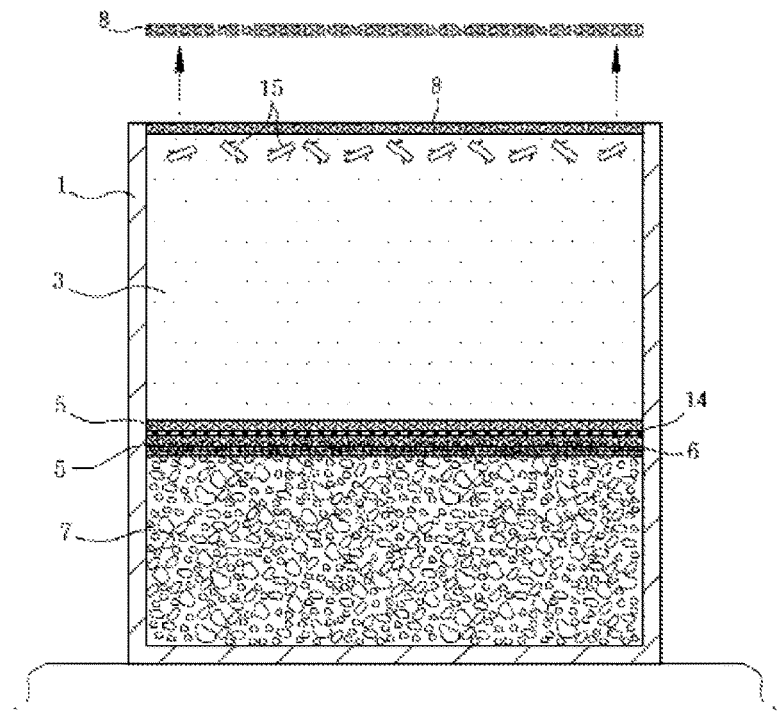
FIG. 4 is a sectional diagram of FIG. 3.

One example of the cultivation management apparatus for the edible perennial herbaceous flowering plants and bulbs and tubers shown in FIGS. 3 and 4 includes a water tank flowerpot 1, a plant growth soil member 3, a partition member 5, a solid fertilizer 15, a root separation inducting member 6, a moisture loss preventing member 8, a water supply member 9 and a water outlet hole 10.

The water tank flowerpot 1 contains water to keep a constant deep flow culture state. The water tank flowerpot 1 is filled with the moisture absorption member 7 up to a preset height to provide the moisture to the edible perennial herbaceous flowering plants and bulbs and tubers and the moisture absorption member 7 consists of Hugato or Orchid stone and pearlite to absorb a predetermined amount of moisture.

The water outlet hole 10 is formed in an outer surface of the water tank flowerpot 1 and configured to adjust a water level so as to keep water contained in the water tank flowerpot in order of 40%~60%, when the edible perennial herbaceous flowering plants and bulbs and tubers is rooted. For propagation by cutting, the plant growth soil 3 temporarily impregnates the moisture. A proper water level is 40%~60% to provide a normal plant growth environment once rooting is completed.

The plant growth soil member 3 is provided over the moisture absorption member 7 and a mixture soil (which consists of a culture soil, a solid fertilizer, an organic culture soil, an organic fertilizer, an organic fermented mixture soil) is filled up to an upper portion of the water tank flowerpot 1, so as to plant and root a rhizosphere portion of the edible perennial herbaceous flowering plants and bulbs and tubers and to keep stable plant growth. Cutting slips 15 of the edible plants is planted in the mixture soil according to the propagation by cutting. In a preset time period, the edible plants are rooted to complete the planting.

The partition member 5 is disposed between the moisture absorption member 7 and the plant growth soil member 3 to partition off them from each other and it transfer the moisture in a state of deep flow culture of the water tank flowerpot to the planted edible perennial herbaceous flowering plants and bulbs and tubers. A pair of partition members 5 may be disposed and the pair of the partition members 5 may be formed of a moisturizing material formed of non-woven fabric, wood pulp, cotton or cotton broad cloth to be impregnated with the moisture of the moisture absorption member 7. The partition member 5 is formed of a synthetic resin material or a natural material and it may absorb the moisture from the moisture absorption member 7 to supply it to the plant growth soil member 3, while partitioning off the moisture absorption member 7 from the plant growth soil member 3.

Moreover, the partition member 5 may separate the plant growth soil member 3 from the moisture absorption member 7 easily and fill a new partition member 5 and plant growth soil member 3 rapidly, so that the edible perennial herbaceous flowering plants and bulbs and tubers may be planted in the manner of the propagation by cutting.

The solid fertilizer 14 is provided between the pair of the partition members 5 and it gradually dissolves in the impregnated water of the partition members 5 to supply proper nutrient solution to the edible perennial herbaceous flowering plants and bulbs and tubers which are planted in the plant growth soil member 3. The solid fertilizer 14 is properly provided in a space between the partition members 5, so that a small amount of the solid fertilizer 14 may constantly dissolve in the sufficient water to supply the proper nutrient solution to the edible perennial herbaceous flowering plants and bulbs and tubers.

The root separation inducting member 6 is provided between a bottom surface of the partition member 5 and the moisture absorption member 7 and it forcibly induces the root to separate the moisture absorption member 7 and the partition member 5 from each other rapidly, when root of the edible perennial herbaceous flowering plants and bulbs and tubers is taken to the moisture absorption member 7 over the partition member 3, in other words, in compensatory planting. The root separation inducting member 6 is formed of a mesh net.

One or more moisture separation inducting members 8 may be detachably provided and arranged in an exposed surface of the plant growth soil member 3 to prevent the moisture from being lost and dry from the plant growth soil member 3 having the cutting slips 15 planted therein for the propagation by cutting. Accordingly, the root of the edible perennial herbaceous flowering plants and bulbs and tubers may be rooted rapidly. Specifically, the cutting slips 15 withers in the dry plant growth soil member 3 but rapidly roots in the plant growth soil member 3 having proper moisture to facilitate the propagation by cutting.

The water supply member 9 penetrates the plant growth soil member 3 and closely contacts with the moisture absorption member 7 of the water tank flowerpot 1 to supply water, so that the water may be stored in the water tank flowerpot 1 at a preset water level. Alternatively, the water supply member 9 may contact with the root separation inducting member 6 and the partition member 5 and supply water.

In the cultivation management apparatus for edible perennial herbaceous flowering plants and bulbs and tubers according to the present disclosure as shown in FIG. 4, the moisture absorption member 7, the root separation inducting member 6, the partition member 5, the plant growth soil member 3, the moisture loss preventing member 8 are sequentially disposed in the water tank flowerpot 1. A sold fertilizer 15 is provided between the partition members and the water outlet hole 10 is formed in a lateral surface of the water tank flowerpot 1. In this instance, water is supplied to the water tank flowerpot 1 via the water supply member 9 and the water is contained at a preset water level by the water outlet hole 10, so that the water supply may be performed stably and that the moisture is constantly supplied to the plant growth soil member 3 to be in a moisturized state. To keep the moisturized state, the moisture loss preventing member 8 covers the plant growth soil member 3. At this time, the cutting slips 15 of the edible perennial herbaceous flowering plants and bulbs and tubers are planted for the propagation by cutting.

When the cutting slips 15 are rooted in a preset time period, the moisture loss preventing member 8 is removed to form a dry state up to a certain degree. In this instance, the moisture of the moisture absorption member 7 is supplied to the plant growth soil member 3 along the partition member 5 and transferred to the edible plants so as to facilitate normal growth and development of the plants.

A small amount of the solid fertilizer 15 provided between the pair of the partition members 15 dissolves in the water of the moisture absorption member 7 and supplied to the edible plants through the plant growth soil member 3. Accordingly, active growth may be enabled.

Such the water tank flowerpot has mobility and it can set climatic environment in summer or winter appropriately.

Figure 5:
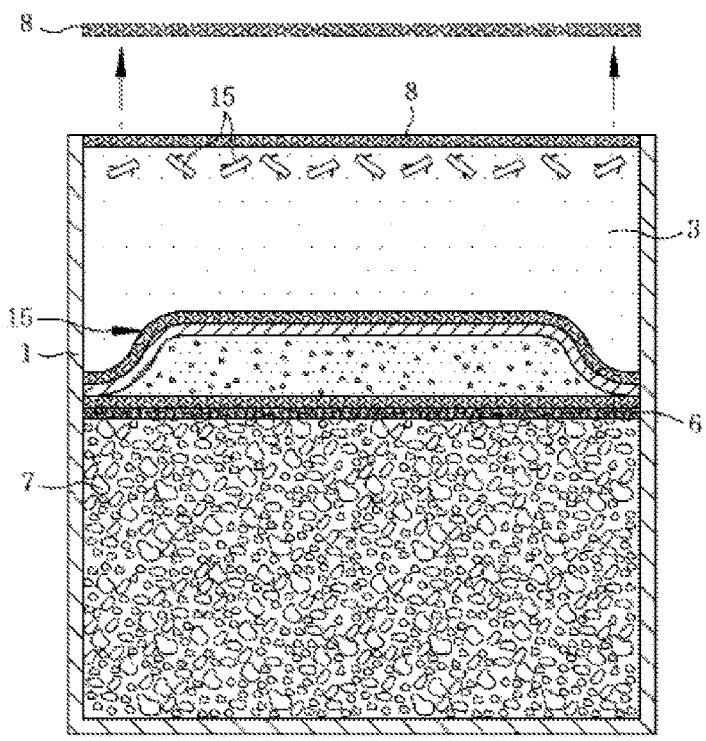
FIG. 5 is a sectional diagram illustrating a further example of a cultivation management apparatus for edible perennial herbaceous flowering plants and bulbs and tubers in accordance with the embodiment of the present disclosure.

Meanwhile, in another example of the embodiment shown in FIG. 5, an organic fertilizer pack 11 may replace the partition member 5. In other words, there are provided a water tank flowerpot 1, a moisture absorption member 5, a root separation inducing member 6, an organic fertilizer pack 11, a plant growth soil member 3 and a moisture loss preventing member 7. Although not shown in FIG. 5, the water supply member shown in FIGS. 1 and 3 penetrates the plant growth soil member 3 and contacts with the moisture absorption member 7 to receive water and to store the water in the water tank flowerpot 1. In this instance, several cutting slips 15 are planted in the plant growth soil member 3 to facilitate the propagation by cutting.

Except the organic fertilizer pack, the water tank flowerpot 1, the moisture absorption member 7, the root separation inducting member 6, the plant growth soil member 3 and the moisture loss preventing member 8 are identical to the corresponding ones described, referring to FIG. 4. The organic fertilizer pack 11 includes an organic compost which provides an environment where microorganisms survive and an organic fertilizer mixed with mineral ores (50.8% calcium, 29.4% phosphorus, 6.7% potassium, 5.1% sulfur, 3.7% chlorine, 2.9% sodium, 1.1% magnesium, 0.3% zinc and copper).

Referring to the accompanying drawings, a cultivation management apparatus for edible perennial herbaceous flowering plants and bulbs and tubers in accordance with one exemplary embodiment of the present disclosure will be described in detail.

Figure 6:
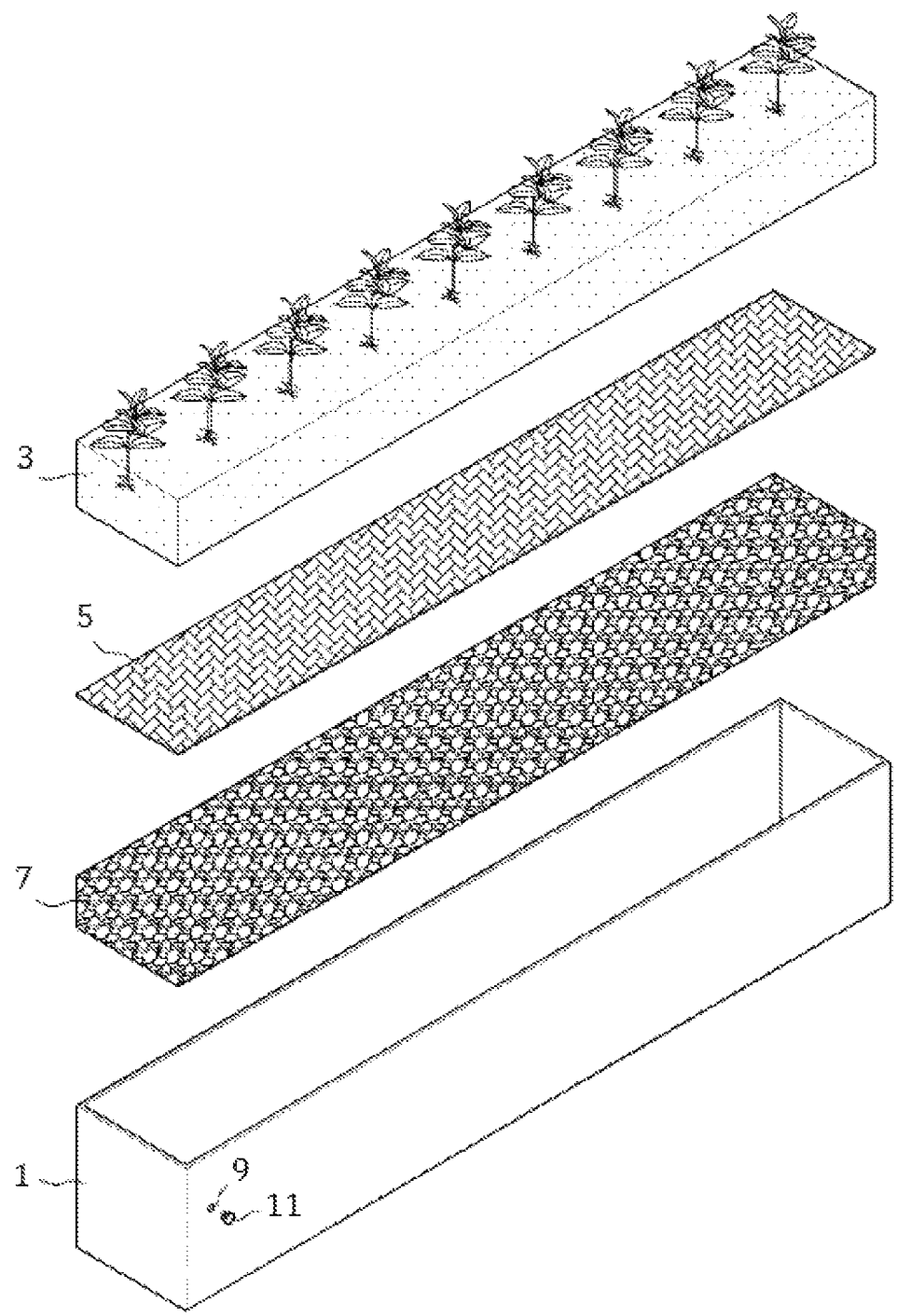
FIG. 6 is an exploded perspective diagram illustrating one example of a cultivation management apparatus for edible perennial herbaceous flowering plants and bulbs and tubers in accordance with another embodiment of the present disclosure.
Figure 7:
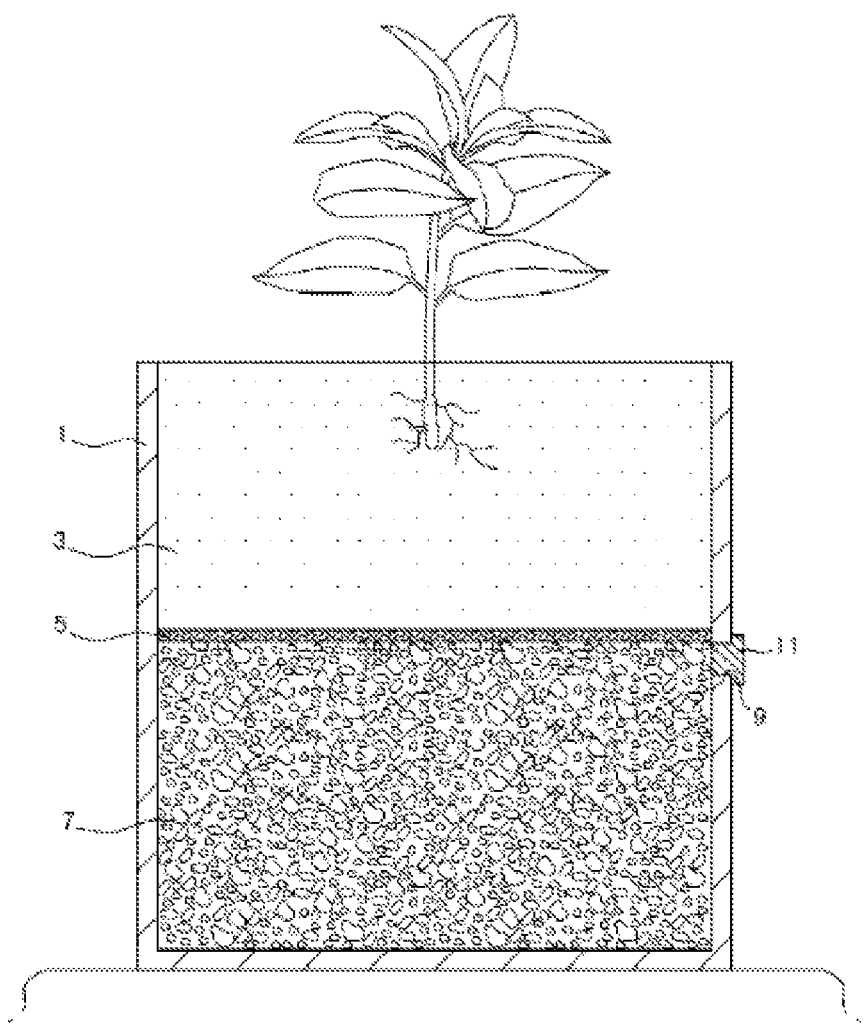
FIG. 7 is a sectional diagram of FIG. 6.

The cultivation management apparatus for edible perennial herbaceous flowering plants and bulbs and tubers shown in FIGS. 6 and 7 includes a water tank flowerpot 1, a plant growth soil member 3 and a partition member 5.

The water tank flowerpot 1 contains water to keep a constant deep flow culture state. The water tank flowerpot 1 is filled with the moisture absorption member 7 up to a preset height to provide the moisture to the edible perennial herbaceous flowering plants and bulbs and tubers and the moisture absorption member 7 consists of Hugato or Orchid stone and pearlite to absorb a predetermined amount of moisture.

An outlet hole 9' and a stopper 11' are formed in an outer surface of the water tank flowerpot 1 and configured to adjust a water level so as to keep water contained in the water tank flowerpot in order of 40%~60%, when the edible perennial herbaceous flowering plants and bulbs and tubers is rooted. For propagation by cutting, a water level is adjusted up to the plant growth soil member 3. A proper water level is 40%~60% to provide a normal plant growth environment once rooting is completed.

In this instance, the outlet hole 9' and the stopper 11' are fastened by a screw. A manager may open the stopper 11' when checking rooting and drains most of the water, leaving the water contained in the water tank flowerpot 1 up to 40%~60% of the water level.

The plant growth soil member 3 is provided over the moisture absorption member 7 and a mixture soil (which consists of a culture soil, a solid fertilizer, an organic culture soil, an organic fertilizer, an organic fermented mixture soil) is filled up to an upper portion of the water tank flowerpot 1, so as to plant and root a rhizosphere portion of the edible perennial herbaceous flowering plants and bulbs and tubers and to keep stable plant growth. Cutting slips 15 of the edible plants is planted in the mixture soil according to the propagation by cutting. In a preset time period, the edible plants are rooted to complete the planting.

The partition member 5 is disposed between the moisture absorption member 7 and the plant growth soil member 3 to partition off them from each other and it transfer the moisture in a state of deep flow culture of the water tank flowerpot to the planted edible perennial herbaceous flowering plants and bulbs and tubers. The partition member 5 is a moisturizing material formed of non-woven fabric, wood pulp, cotton or cotton broad cloth to be impregnated with the moisture of the moisture absorption member 7. The partition member 5 is formed of a synthetic resin material or a natural material and it may absorb the moisture from the moisture absorption member 7 to supply it to the plant growth soil member 3, while partitioning off the moisture absorption member 7 from the plant growth soil member 3.

Moreover, the partition member 5 may separate the plant growth soil member 3 from the moisture absorption member 7 easily and fill a new partition member 5 and plant growth soil member 3 rapidly, so that the edible perennial herbaceous flowering plants and bulbs and tubers may be planted in the manner of the propagation by cutting.

In the cultivation management apparatus for the edible perennial herbaceous flowering plants and bulbs and tubers according to the present disclosure as shown in FIG. 7, the moisture absorption member 7, the partition member 5, the plant growth soil member 3 are sequentially disposed in the water tank flowerpot 1. The stopper 11' is fastened to the outlet hole 9' by a screw. Water is supplied to the water tank flowerpot and 90% or more of the inner space is immersed and the edible perennial herbaceous flowering plants and bulbs and tubers are planted on the plant growth soil member 3 in the manner of the propagation by cutting. When the edible perennial herbaceous flowering plants and bulbs and tubers are rooted in a preset time period, the stopper 11' fastened to the outlet hole 9' is open and the water level is lowered down to 40% to 60%. In this instance, the moisture of the moisture absorption member 7 is supplied to the plant growth soil member 3 along the partition member 5 and transferred to the edible plants so as to facilitate normal growth and development of the plants.

Such the water tank flowerpot has mobility and it can set climatic environment in summer or winter appropriately.

Meanwhile, in case the moisture absorption member 7 and the plant growth soil member 3 are separable from each other, the edible perennial herbaceous flowering plants and bulbs and tubers may grow even without the partition member 5.

Figure 8:
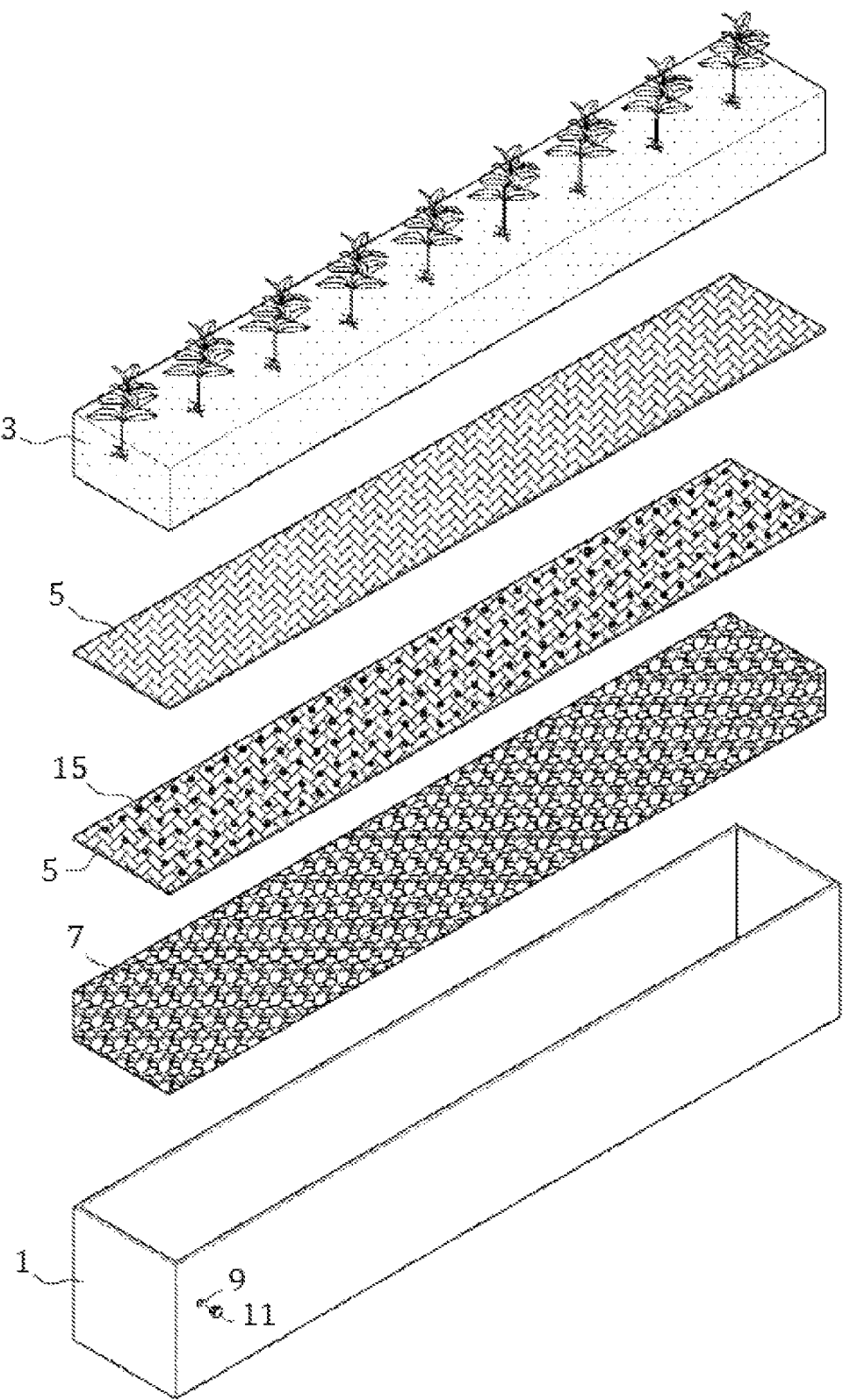
FIG. 8 is a sectional diagram illustrating a further example of a cultivation management apparatus for edible perennial herbaceous flowering plants and bulbs and tubers in accordance with the embodiment of the present disclosure.
Figure 9:
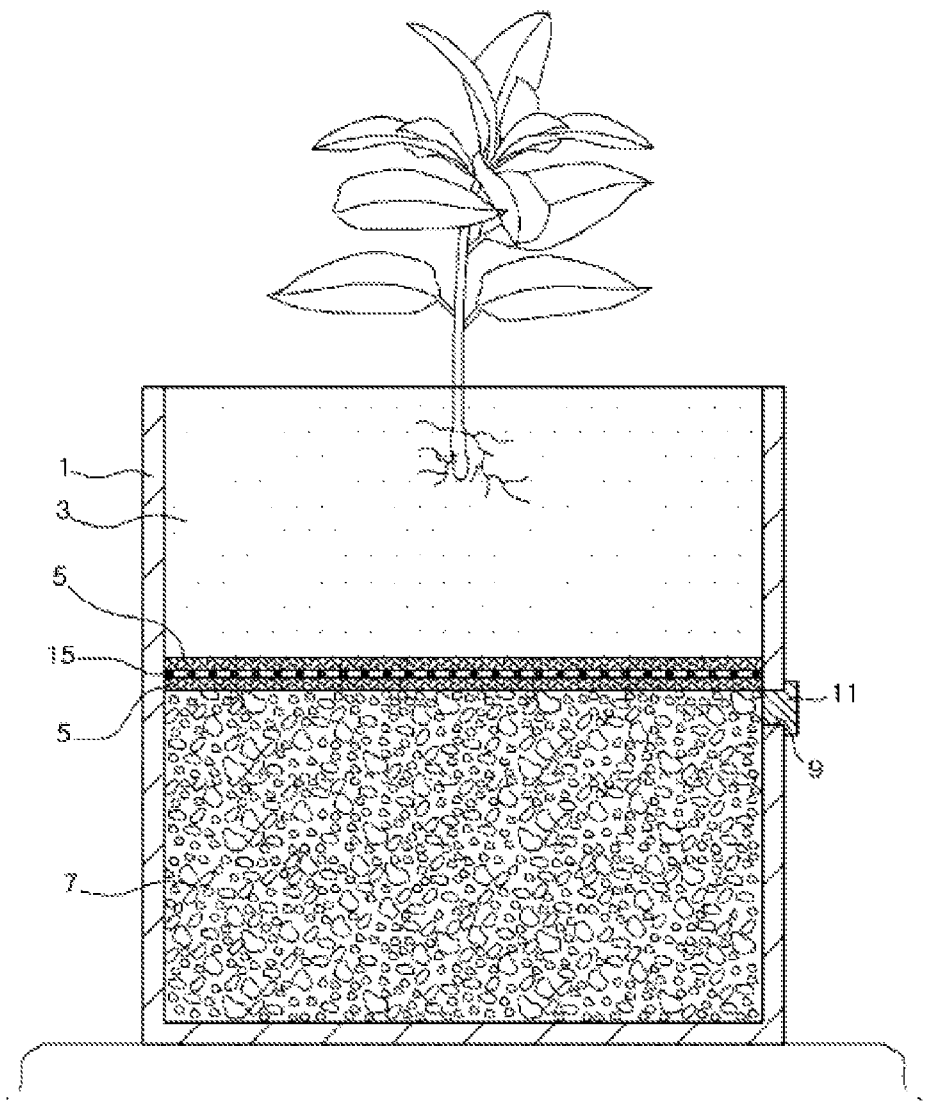
FIG. 9 is a sectional diagram of FIG. 3.

One example of the cultivation management apparatus for the edible perennial herbaceous flowering plants and bulbs and tubers shown in FIGS. 8 and 9 includes a water tank flowerpot 1, a plant growth soil member 3, a partition member 5 and a solid fertilizer 14.

The water tank flowerpot 1 contains water to keep a constant deep flow culture state. The water tank flowerpot 1 is filled with the moisture absorption member 7 up to a preset height to provide the moisture to the edible perennial herbaceous flowering plants and bulbs and tubers and the moisture absorption member 7 consists of Hugato or Orchid stone and pearlite to absorb a predetermined amount of moisture.

An outlet hole 9' and a stopper 11' are formed in an outer surface of the water tank flowerpot 1 and configured to adjust a water level so as to keep water contained in the water tank flowerpot in order of 40%~60%, when the edible perennial herbaceous flowering plants and bulbs and tubers is rooted. For propagation by cutting, a water level is adjusted up to the plant growth soil member 3. A proper water level is 40%~60% to provide a normal plant growth environment once rooting is completed.

In this instance, the outlet hole 9' and the stopper 11' are fastened by a screw. A manager may open the stopper 11' when checking rooting and drains most of the water, leaving the water contained in the water tank flowerpot 1 up to 40%~60% of the water level.

The plant growth soil member 3 is provided over the moisture absorption member 7 and a mixture soil (which consists of a culture soil, a solid fertilizer, an organic culture soil, an organic fertilizer, an organic fermented mixture soil) is filled up to an upper portion of the water tank flowerpot 1, so as to plant and root a rhizosphere portion of the edible perennial herbaceous flowering plants and bulbs and tubers and to keep stable plant growth. Cutting slips 15 of the edible plants is planted in the mixture soil according to the propagation by cutting. In a preset time period, the edible plants are rooted to complete the planting.

The partition member 5 is disposed between the moisture absorption member 7 and the plant growth soil member 3 to partition off them from each other and it transfer the moisture in a state of deep flow culture of the water tank flowerpot to the planted edible perennial herbaceous flowering plants and bulbs and tubers. A pair of partition members 5 may be disposed and the pair of the partition members 5 may be formed of a moisturizing material formed of non-woven fabric, wood pulp, cotton or cotton broad cloth to be impregnated with the moisture of the moisture absorption member 7. The partition member 5 is formed of a synthetic resin material or a natural material and it may absorb the moisture from the moisture absorption member 7 to supply it to the plant growth soil member 3, while partitioning off the moisture absorption member 7 from the plant growth soil member 3.

Moreover, the partition member 5 may separate the plant growth soil member 3 from the moisture absorption member 7 easily and fill a new partition member 5 and plant growth soil member 3 rapidly, so that the edible perennial herbaceous flowering plants and bulbs and tubers may be planted in the manner of the propagation by cutting.

The solid fertilizer 14 is provided between the pair of the partition members 5 and it gradually dissolves in the impregnated water of the partition members 5 to supply proper nutrient solution to the edible perennial herbaceous flowering plants and bulbs and tubers which are planted in the plant growth soil member 3. The solid fertilizer 14 is properly provided in a space between the partition members 5, so that a small amount of the solid fertilizer 14 may constantly dissolve in the sufficient water to supply the proper nutrient solution to the edible perennial herbaceous flowering plants and bulbs and tubers.

As shown in FIG. 9, the moisture absorption member 7, the pair of the partition members 5, the plant growth soil member 3 are sequentially disposed in the water tank flowerpot 1. The solid fertilizer 14 is provided between the partition members 5 and the stopper 11' is fastened to the outlet hole 9' by a screw. Water is supplied to the water tank flowerpot and 90% or more of the inner space is immersed and the edible perennial herbaceous flowering plants and bulbs and tubers are planted on the plant growth soil member 3 in the manner of the propagation by cutting. When the edible perennial herbaceous flowering plants and bulbs and tubers are rooted in a preset time period, the stopper 11' fastened to the outlet hole 9' is open and the water level is lowered down to 40% to 60%. In this instance, the moisture of the moisture absorption member 7 is supplied to the plant growth soil member 3 along the partition member 5 and transferred to the edible plants so as to facilitate normal growth and development of the plants.

A small amount of the solid fertilizer 15 provided between the pair of the partition members 15 dissolves in the water of the moisture absorption member 7 and supplied to the edible plants through the plant growth soil member 3. Accordingly, active growth may be enabled.

Such the water tank flowerpot has mobility and it can set climatic environment in summer or winter appropriately.

Referring to the accompanying drawings, a cultivation management apparatus for edible perennial herbaceous flowering plants and bulbs and tubers in accordance with one exemplary embodiment of the present disclosure will be described in detail.

Figure 10:
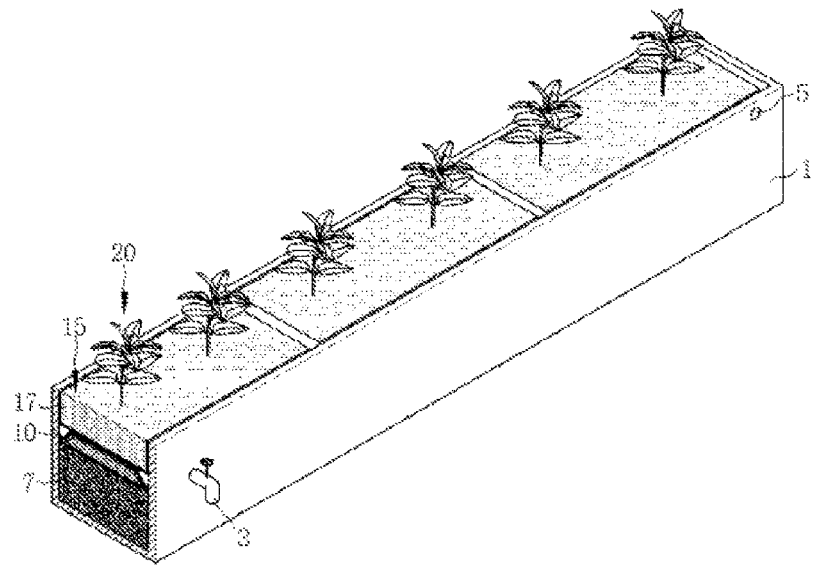
FIG. 10 is a perspective diagram illustrating one example of a cultivation management apparatus for edible perennial herbaceous flowering plants and bulbs and tubers in accordance with a further embodiment of the present disclosure.
Figure 11:
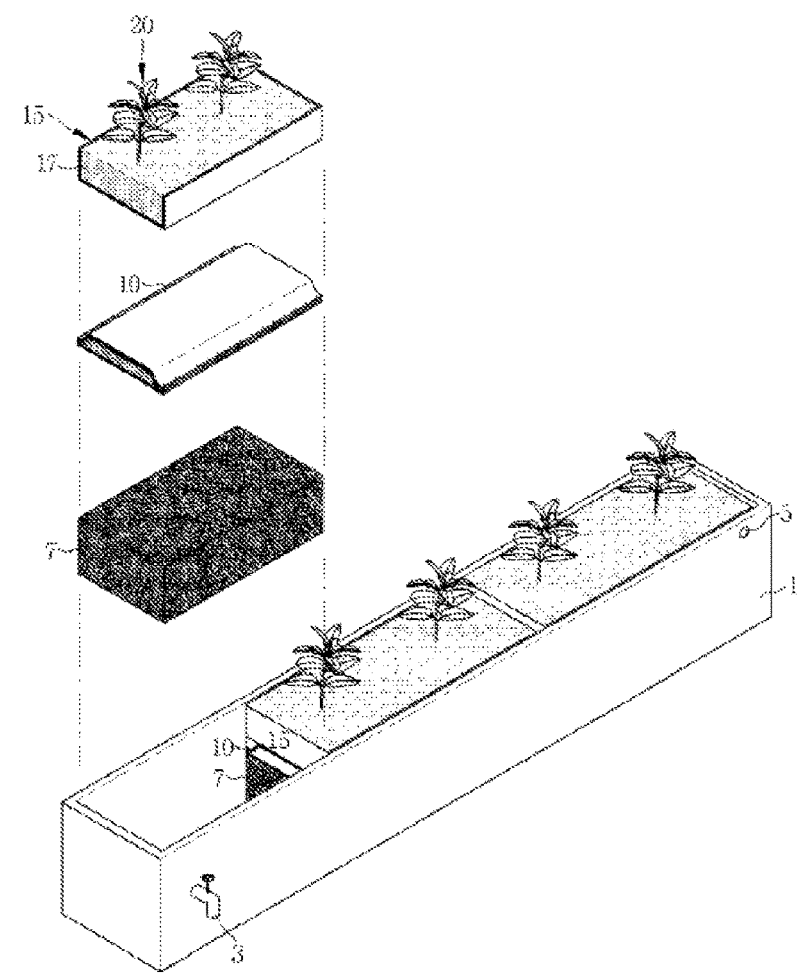
FIG. 11 is an exploded perspective diagram illustrating one example of the cultivation management apparatus for edible perennial herbaceous flowering plants and bulbs and tubers in accordance with the embodiment of the present disclosure.

The cultivation management apparatus for edible perennial herbaceous flowering plants and bulbs and tubers shown in FIGS. 10 and 11 includes a water tank flowerpot 1, an organic fertilizer pack 10' and an organic planting environment providing element 15'

The water tank flowerpot 1 contains water to supply moisture to edible plants (wild parsley, asparagus and the like) corresponding to the edible perennial herbaceous flowering plants and bulbs and tubers 20 planted in the organic planting environment providing element 15'.

The moisture absorption member 7 formed of Hugato or Orchid stone is uniformly contained in the water tank flowerpot 1 by a small amount. The organic fertilizer pack 10' and the organic planting environment providing element 15' are sequentially disposed on the moisture absorption member 7.

A water level adjusting valve 3' and an overflow hole 5' are formed in an outer surface of the water tank flowerpot 1. The water level adjusting valve 3' is configured to adjust a water level by 40%~50% once the edible perennial herbaceous flowering plants and bulbs and tubers 20 are rooted and the overflow hole 5' is configured to adjust a water level by 85%~95% until the edible perennial herbaceous flowering plants and bulbs and tubers are rooted.

In this instance, the manager uses the water level adjusting valve 3' in order to check a rooting state of the edible perennial herbaceous flowering plants and bulbs and tubers 20 (especially, wild parsley) or to drain the water contained in the water tank flowerpot 1 for normal planting, except 40%~50% of the water. The manager uses the overflow hole 5' so as to allow water contained in the water tank flowerpot 1 up to 85%~95% and to facilitate the propagation by cutting.

The organic fertilizer pack 10' is provided under the organic planting environment providing element 15' and filled with an organic compost which provides an environment where microorganisms survive and an organic fertilizer mixed with mineral ores (50.8% calcium, 29.4% phosphorus, 6.7% potassium, 5.1% sulfur, 3.7% chlorine, 2.9% sodium, 1.1% magnesium, 0.3% zinc and copper). The organic fertilizer pack 10' is immersed when cutting propagation of the edible perennial herbaceous flowering plants and bulbs and tubers is performed. It is not immersed and moisture is soaked to create the environment where microorganisms can survive, once the edible perennial herbaceous flowering plants and bulbs and tubers are rooted.

The organic planting environment providing element 15' is formed of cotton or rough cotton cloth and a predetermined space is formed in the organic planting environment providing element 15' by a mesh material having a drainage function. A top of the space is open and an organic fermented member 17 mixed with an air gap forming material and an animal manure of 5%~10% is filled in the space. The air gap forming member includes one or more of straw and sawdust to have porosity with air. One or more of the edible perennial herbaceous flowering plants and bulbs and tubers 20 is planted in the organic fermented member 17. The dissolved oxygen of the organic fermented member 17 is maximized by the air gap forming member (for facilitating air supply by forming air gap, using straw and sawdust.

When the edible perennial herbaceous flowering plants and bulbs and tubers 20 are rooted in the organic planting environment providing element 15' and the organic fertilizer 10' and the water level in the water tank flowerpot 1 is adjusted by the water level adjusting valve 3' by 40%~50%, aerobic microbes and anaerobic microbes may coexist in the environment formed by the organic fermented member 17 and the organic compost. The aerobic and anaerobic microorganisms allow necessary nutrients provided to the edible perennial herbaceous flowering plants and bulbs and tubers 20.

The organic planting environment providing element 15' may be replaced by a planting flowerpot having a fast drainage function. The organic fermented member 17 may be replaced by a mixture of organic soil and animal manure, with an air gap forming material.

Figure 12:
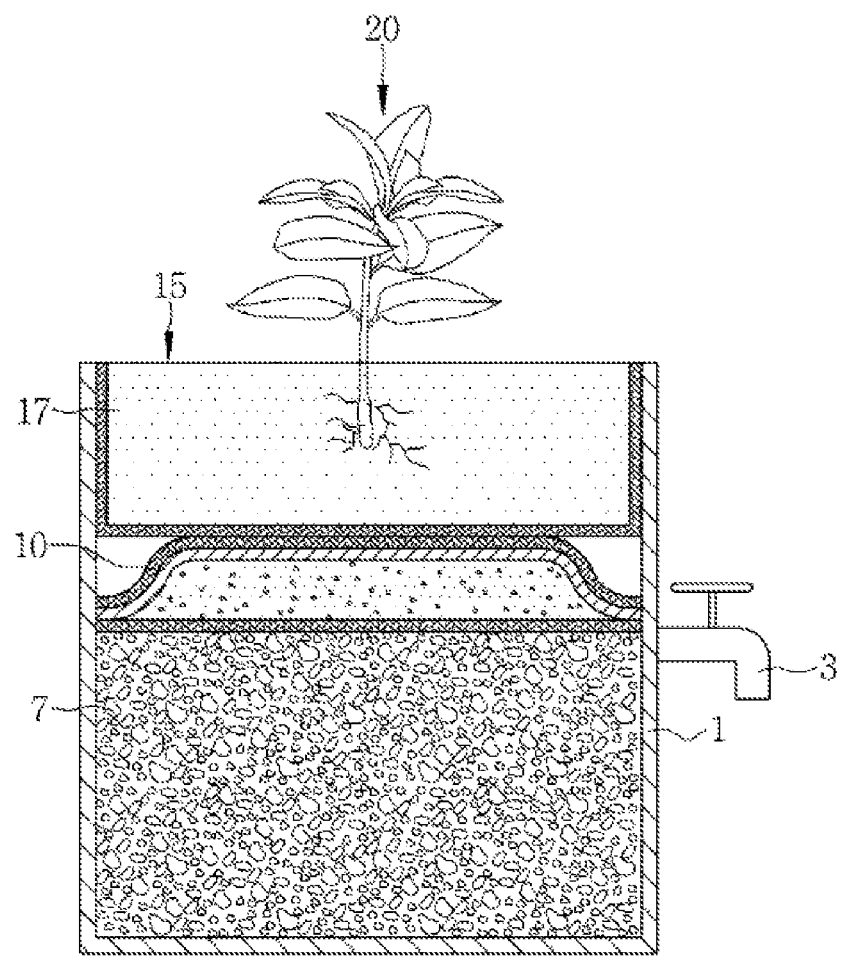
FIG. 12 is a sectional diagram illustrating one example of the cultivation management apparatus for edible perennial herbaceous flowering plants and bulbs and tubers in accordance with the embodiment of the present disclosure.

The cultivation management apparatus for edible perennial herbaceous flowering plants and bulbs and tubers in accordance with the present disclosure is shown in FIG. 12.

The edible perennial herbaceous flowering plants and bulbs and tubers 20 are edible plants including water dropwort (or wild parsley), asparagus and the like. Diverse plants rooted in an immersed state and rooted in a not-immersed state are selectively planted.

Water is supplied via the overflow hole 5' of the water tank flowerpot 1 up to 85%~95% of the water level to cultivate cutting slips of the edible perennial herbaceous flowering plants and bulbs and tubers by cutting. When the cutting slips are cut and the water level is kept by the overflow hole 5' after that, the cutting slips are rooted and have root taken in the organic planting environment providing element 15' stably.

Once the cutting slips are rooted, the manager opens the water level adjusting valve 3' and adjusts the water level down to 40%~50% in a state where the moisture absorption member 7 is immersed. Hence, the organic planting environment providing element 15' and the organic fertilizer pack 10' absorbs moisture from the moisture absorption member 7 through the moisturizing material, to keep a constant moisturized state. At this time, a low temperature state for dormancy is kept for a preset time period in case low temperature treatment is needed according to growth conditions of the edible perennial herbaceous flowering plants and bulbs and tubers 20. An air gap is formed in the organic planting environment providing element 15' by the air gap forming member, to form an oxygen supply maximizing state. In addition, a similar state is formed in the organic fertilizer pack 10'.

Accordingly, the edible perennial herbaceous flowering plants and bulbs and tubers 20 planted in the organic planting environment providing element 15' are provided with sufficient nutrients and oxygen and an optimized growth environment is created.

Meanwhile, the water tank flowerpot 1 may be moved to provide a desired climatic environment, in case a climatic environment is needed.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A cultivation management apparatus for edible perennial herbaceous flowering plants and bulbs and tubers comprising:
   a water tank flowerpot comprising a moisture absorption member having pearlite and Orchid stone and filled therein to a preset height from a bottom of the water tank flowerpot so as to provide moisture to the edible perennial herbaceous flowering plants and bulbs and tubers; and both of an outlet hole and a stopper in an outer surface of the water tank flowerpot to adjust a water level so that the water tank flowerpot contains 40%~60% of water when the edible perennial herbaceous flowering plants and bulbs and tubers are rooted;
   a plant growth soil member provided over the moisture absorption member, and filled with any one of a soil mixture, a culture soil, and organic fermented soil mixture mixed with a solid fertilizer to an upper portion of the water tank flowerpot so as to plant and root a rhizosphere portion of the edible perennial herbaceous flowering plants and bulbs and tubers and to keep stable plant growth;
   at least one partition member provided between the moisture absorption member and the plant growth soil member to partition off the moisture absorption member from the plant growth soil member, and comprising a moisturizing material including any one of non-woven fabric, wood pulp, cotton, and cotton broad cloth to be impregnated with moisture from the moisture absorption member;
   a moisture loss preventing member provided on the plant growth soil member to prevent exposure of the plant growth soil member and including a moisturizing material to impregnate and retain moisture within the plant growth soil member; and
   a cylindrical water supply member which penetrates the plant growth soil member and contacts the moisture absorption member of the water tank flowerpot to supply water to the water tank flowerpot rapidly.

2. The cultivation management apparatus of claim 1, wherein a root separation inducting member is provided between the at least one partition member and the moisture absorption member to separate the moisture absorption member from the at least one partition member rapidly and the moisture loss preventing member is removable to expose the plant growth soil member, when the edible perennial herbaceous flowering plants and bulbs are rooted in the plant growth soil member.

3. The cultivation management apparatus of claim 1, wherein the at least one partition member comprises a pair of partition members are disposed between the moisture absorption member and the plant growth soil member to partition off the moisture absorption member from the plant growth soil member, and
   the cultivation management apparatus for edible perennial herbaceous flowering plants and bulbs further comprising:
   a solid fertilizer provided between the pair of the partition members and configured to gradually dissolve in water within the pair of partition members to supply proper nutrient solution to the edible perennial herbaceous flowering plants and bulbs and tubers which are planted in the plant growth soil member.

4. A cultivation management apparatus for edible perennial herbaceous flowering plants and bulbs comprising:
- a water tank flowerpot comprising a moisture absorption member having pearlite and Orchid stone and filled therein to a preset height from a bottom of the water tank flowerpot so as to provide moisture to the edible perennial herbaceous flowering plants and bulbs and tubers; and both of an outlet hole and a stopper in an outer surface of the water tank flowerpot to adjust a water level so that the water tank flowerpot contains 40%~60% of water, when the edible perennial herbaceous flowering plants and bulbs and tubers are rooted;
- a plant growth soil member provided over the moisture absorption member and filled with any one of a soil mixture, a culture soil, and organic fermented soil mixture mixed with a solid fertilizer to an upper portion of the water tank flowerpot, so as to plant and root a rhizosphere portion of the edible perennial herbaceous flowering plants and bulbs and tubers and to keep stable plant growth;
- a fertilizer pack provided between a pair of partition members, the fertilizer pack configured to gradually dissolve in water within the pair of partition members to supply proper nutrient solution to the edible perennial herbaceous flowering plants and bulbs and tubers which are planted in the plant growth soil member, the pair of partition members provided between the moisture absorption member and the plant growth soil member to partition off the moisture absorption member from the plant growth soil member;
- a moisture loss preventing member provided on the plant growth soil member to prevent exposure of the plant growth soil member and including a moisturizing material to impregnate and retain moisture within the plant growth soil member; and
- a cylindrical water supply member which penetrates the plant growth soil member and contacts the moisture absorption member of the water tank flowerpot to supply water to the water tank flowerpot rapidly.

5. The cultivation management apparatus of claim 4, wherein a root separation inducting member is provided between the fertilizer pack and the moisture absorption member to separate the moisture absorption member from the fertilizer pack rapidly.

6. The cultivation management apparatus of claim 4, wherein the moisture loss preventing member is removable to expose the plant growth soil member, when the edible perennial herbaceous flowering plants and bulbs are rooted in the plant growth soil member.

7. The cultivation management apparatus of claim 4, wherein the fertilizer pack includes an organic compost which provides an environment where microorganisms survive and an organic fertilizer mixed with 50.8% calcium, 29.4% phosphorus, 6.7% potassium, 5.1% sulfur, 3.7% chlorine, 2.9% sodium, 1.1% magnesium, 0.3% zinc and copper.

8. A cultivation management apparatus for edible perennial herbaceous flowering plants and bulbs and tubers comprising: an organic planting environment providing element comprising any one of cotton and rough cotton cloth, and a predetermined space therein comprising a mesh material configured to provide drainage; the predetermined space having an open top and filled with an organic fermented member mixed with an air gap forming material, and an animal manure; the air gap forming member comprising one or more of straw and sawdust to provide a porous medium for planting one or more of the edible perennial herbaceous flowering plants and bulbs and tubers in the organic fermented member;
- an organic fertilizer pack provided under the organic planting environment providing element and filled with an organic compost which provides an environment where microorganisms survive, and an organic fertilizer mixed with 50.8% calcium, 29.4% phosphorus, 6.7% potassium, 5.1% sulfur, 3.7% chlorine, 2.9% sodium, 1.1% magnesium, 0.3% zinc and copper; and
- a water tank flowerpot comprising a moisture absorption member having any one of Hugato and Orchid stone, and the organic fertilizer and the organic planting environment providing element disposed on the moisture absorption member, the water tank flowerpot further comprising a water level adjusting valve and an overflow hole on an outer surface of the water tank flowerpot so that the water tank flowerpot contains 40%~50% of water when the edible perennial herbaceous flowering plants and bulbs and tubers are rooted and contains 85%~95% of water until the edible perennial herbaceous flowering plants and bulbs and tubers are rooted.

9. The cultivation management apparatus of claim 8, wherein aerobic microbes and anaerobic microbes coexist in the environment formed by the organic fermented member and the organic compost, when the edible perennial herbaceous flowering plants and bulbs and tubers are rooted in the organic planting environment providing element, and the organic fertilizer and a water level in the water tank flowerpot is adjusted by the water level adjusting valve by 40%~50%.

10. The cultivation management apparatus of claim 8, wherein the organic planting environment providing element is replaceable with a planting flowerpot having a fast drainage function, and
the organic fermented member is replaceable with a mixture of organic soil.

\* \* \* \* \*